(12) United States Patent
Tsai

(10) Patent No.: US 11,785,642 B2
(45) Date of Patent: Oct. 10, 2023

(54) METHODS AND APPARATUSES FOR DISCONTINUOUS RECEPTION OPERATIONS FOR BEAM FAILURE RECOVERY PROCEDURE

(71) Applicant: FG Innovation Company Limited, Tuen Mun (HK)

(72) Inventor: Hsin-Hsi Tsai, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 36 days.

(21) Appl. No.: 17/033,108

(22) Filed: Sep. 25, 2020

(65) Prior Publication Data

US 2021/0105827 A1  Apr. 8, 2021

Related U.S. Application Data

(60) Provisional application No. 62/909,957, filed on Oct. 3, 2019.

(51) Int. Cl.
*H04W 74/08* (2009.01)
*H04B 7/06* (2006.01)
(Continued)

(52) U.S. Cl.
CPC ...... *H04W 74/0833* (2013.01); *H04B 7/0695* (2013.01); *H04W 72/23* (2023.01); *H04W 76/28* (2018.02)

(58) Field of Classification Search
CPC ........... H04W 74/0833; H04W 72/042; H04W 76/28; H04B 7/0695; H04B 7/088
See application file for complete search history.

(56) References Cited

U.S. PATENT DOCUMENTS

2018/0270713 A1\* 9/2018 Park .................. H04L 5/0053
2020/0037248 A1\* 1/2020 Zhou .................. H04B 7/022
(Continued)

FOREIGN PATENT DOCUMENTS

CN    109565753 A    2/2019
CN    109565895 A    2/2019
(Continued)

OTHER PUBLICATIONS

3GPP TS 38.321 V1.2.0 (Dec. 2017), 3rd Generation Partnership Project; Technical Specification Group Radio Access Network; NR; Medium Access Control (MAC) protocol specification (Release 15) (Year: 2017).\*

(Continued)

*Primary Examiner* — Shailendra Kumar
(74) *Attorney, Agent, or Firm* — ScienBiziP, P.C.

(57) ABSTRACT

A communication method performed by a User Equipment (UE) configured with a Discontinuous Reception (DRX) operation includes the UE initiating a Random Access (RA) procedure for Beam Failure Recovery (BFR) on a Special Cell (SpCell) after detecting a beam failure event on the SpCell, and transmitting a BFR Medium Access Control (MAC) Control Element (CE) on the SpCell. The BFR MAC CE indicates the beam failure event for the SpCell. The communication method further includes the UE determining a period of time as a DRX Active Time for the UE. The beginning of the period of time is determined by a first time at which the UE transmits the BFR MAC CE on the SpCell. The end of the period of time is determined by a second time at which the UE receives a BFR Response (BFRR) from the SpCell.

14 Claims, 9 Drawing Sheets

(51) Int. Cl.
*H04W 76/28* (2018.01)
*H04W 72/23* (2023.01)

(56) References Cited

U.S. PATENT DOCUMENTS

2021/0036757 A1* 2/2021 Yu .................... H04L 1/1861
2021/0068162 A1* 3/2021 Agiwal ................ H04L 5/0023

FOREIGN PATENT DOCUMENTS

CN       110035502 A      7/2019
WO    WO-2019135654 A1 *  7/2019  ........... H04B 7/0617

OTHER PUBLICATIONS

3GPP 3GPP TS 38.321 V1.2.0 (Dec. 2017), 3rd Generation Partnership Project; Technical Specification Group Radio Access Network; NR; Medium Access Control (MAC) protocol specification (Release 15), Dec. 31, 2017, sections 5-6.

3GPP TS 38.300, "3rd Generation Partnership Project; Technical Specification Group Radio Access Network; NR; NR and NG-RAN Overall Description; Stage 2 (Release 15)", Technical Specification, V15.6.0 (Jun. 2019).

3GPP TS 38.331, "3rd Generation Partnership Project; Technical Specification Group Radio Access Network; NR; Radio Resource Control (RRC) protocol specification (Release 15)", Technical Specification, V15.6 0 (Jun. 2019).

3GPP TS 38.213, "3rd Generation Partnership Project; Technical Specification Group Radio Access Network; NR; Physical layer procedures for control (Release 15)", Technical Specification, V15.6.0 (Jun. 2019).

3GPP TS 38.321, "3rd Generation Partnership Project; Technical Specification Group Radio Access Network; NR; Medium Access Control (MAC) protocol specification (Release 15)", Technical Specification, V15.6.0 (Jun. 2019).

* cited by examiner

METHODS AND APPARATUSES FOR DISCONTINUOUS RECEPTION OPERATIONS FOR BEAM FAILURE RECOVERY PROCEDURE

CROSS-REFERENCE TO RELATED APPLICATION(S)

The present disclosure claims the benefit of and priority to provisional U.S. patent application Ser. No. 62/909,957 ("the '957 provisional"), filed on Oct. 3, 2019, entitled "Method and apparatus for discontinuous reception operation during beam failure recovery procedure for secondary cell." The content(s) of the '957 provisional is fully incorporated herein by reference for all purposes.

FIELD

The present disclosure generally relates to wireless communications, and more specifically, to methods and apparatuses for Discontinuous Reception (DRX) operations for a Beam Failure Recovery (BFR) procedure.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to methods and apparatuses for DRX operations for a BFR procedure.

According to an aspect of the present disclosure, a communication method performed by a User Equipment (UE) configured with a DRX operation is provided. The communication method includes the UE initiating a Random Access (RA) procedure for BFR on a Special Cell (SpCell) after detecting a beam failure event on the SpCell, and transmitting a BFR Medium Access Control (MAC) Control Element (CE) on the SpCell. The BFR MAC CE indicates the beam failure event for the SpCell. The communication method further includes the UE determining a period of time as a DRX Active Time for the UE. The beginning of the period of time is determined by a first time at which the UE transmits the BFR MAC CE on the SpCell. The end of the period of time is determined by a second time at which the UE receives a BFR Response (BFRR) from the SpCell. The BFRR is received on a Physical Downlink Control Channel (PDCCH) that is addressed to a Cell Radio Network Temporary Identifier (C-RNTI).

According to another aspect of the present disclosure, a UE configured with a DRX operation is provided. The UE includes a memory and at least one processor coupled to the memory. The at least one processor is configured to initiate an RA procedure for BFR on an SpCell after detecting a beam failure event on the SpCell, and transmit a BFR MAC CE on the SpCell. The BFR MAC CE indicates the beam failure event for the SpCell. The at least one processor is further configured to determine a period of time as a DRX Active Time for the UE. The beginning of the period of time is determined by a first time at which the UE transmits the BFR MAC CE on the SpCell. The end of the period of time is determined by a second time at which the UE receives a BFRR from the SpCell. The BFRR is received on a PDCCH that is addressed to a C-RNTI.

BRIEF DESCRIPTION OF THE DRAWINGS

Aspects of the present disclosure are best understood from the following detailed disclosure when read with the accompanying figures. Various features are not drawn to scale. Dimensions of various features may be arbitrarily increased or reduced for clarity of discussion.

DESCRIPTION

Figure 1:
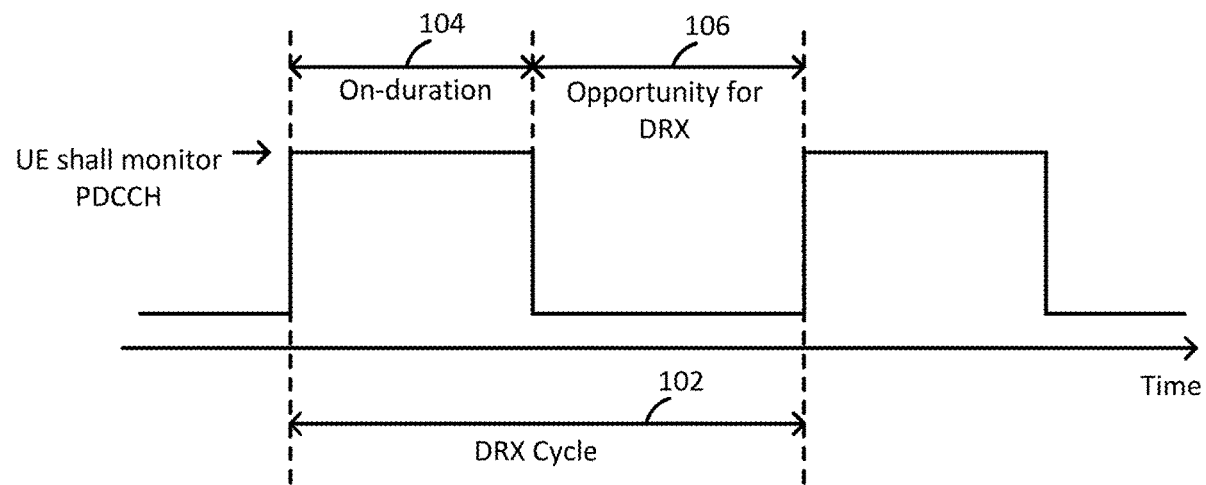
FIG. 1 is a diagram illustrating a DRX cycle, in accordance with an implementation of the present disclosure.

The terms mentioned in the present disclosure are defined as follows. Unless otherwise specified, the terms in the present disclosure have the following meanings.

| Abbreviation | Full name |
| --- | --- |
| 3GPP | 3rd Generation Partnership Project |
| 5G | 5th generation |
| ACK | Acknowledge |

-continued

| Abbreviation | Full name |
| --- | --- |
| BF | Beam Failure |
| BFD | Beam Failure Detection |
| BFI | Beam Failure Instance |
| BFR | Beam Failure Recovery |
| BFRQ | Beam Failure Recovery Request |
| BFRR | Beam Failure Recovery Response |
| BS | Base Station |
| BSR | Buffer Status Report |
| BWP | Band Width Part |
| CC | Component Carriers |
| CE | Control Element |
| CG | Cell Group |
| CSI | Channel State Information |
| CSI-RS | Channel State Information based Reference Signal |
| CQI | Channel Quality Indicator |
| C-RNTI | Cell Radio Network Temporary Identifier |
| DCI | Downlink Control Information |
| DL | Downlink |
| DRX | Discontinuous Reception |
| ID | Identity |
| L1 | Layer 1 |
| L2 | Layer 2 |
| LTE | Long Term Evolution |
| MAC | Medium Access Control |
| MCG | Master Cell Group |
| MIMO | Multi-input Multi-output |
| MSC-C-RNTI | Modulation Coding Scheme Cell Radio Network Temporary Identifier |
| Msg | Message |
| NACK | Negative Acknowledge |
| NBI | New Beam Identification |
| NR | New RAT/Radio |
| NW | Network |
| PCell | Primary Cell |
| PDCCH | Physical Downlink Control Channel |
| PDCP | Packet Data Convergence Protocol |
| PDU | Protocol Data Unit |
| PHY Layer | Physical Layer |
| PRACH | Physical Random Access Channel |
| PSCell | Primary SCell |
| PUCCH | Physical Uplink Control Channel |
| PUSCH | Physical Uplink Shared Channel |
| QoS | Quality of Service |
| RA | Random Access |
| RACH | Random Access Channel |
| RAR | Random Access Response |
| RF | Radio Frequency |
| RLE | Radio Link Control |
| RNTI | Radio Network Temporary Identifier |
| RRC | Radio Resource Control |
| RS | Reference Signal |
| RSRP | Reference Signal Received Power |
| Rx | Reception |
| SCell | Secondary Cell |
| SCG | Secondary Cell Group |
| SDAP | Service Data Adaptation Protocol |
| SDU | Service Data Unit |
| SINR | Signal to Interference plus Noise Ratio |
| SR | Scheduling Request |
| SRS | Sounding Reference Signal |
| SSB | Synchronization Signal Block |
| SpCell | Special Cell |
| TCI | Transmission Configuration Indication |
| TR | Technical Report |
| TRP | Transmission/Reception Point |
| TS | Technical Specification |
| Tx | Transmission |
| UCI | Uplink Control Information |
| UE | User Equipment |
| UL | Uplink |
| UL-SCH | Uplink Shared Channel |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of an MCG or a SCG may be referred to as a Special Cell (SpCell). A PCell may refer to the SpCell of an MCG. A Primary SCG Cell (PSCell) may refer to the SpCell of an SCG. MCG may refer to a group of serving cells associated with the Master Node (MN), including the SpCell and optionally one or more SCells. An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3GPP, may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

An objective of the 5G wireless communication system on NR access technology is to identify and develop technology components needed for NR systems that should be able to use any spectrum band ranging at least up to 100 Gigahertz (GHz). Supporting carrier frequencies up to 100 GHz brings a number of challenges in the area of radio propagation. As the carrier frequency increases, the path loss also increases.

In lower frequency bands (e.g., <6 GHz), the required cell coverage may be provided by forming a wide sector beam for transmitting DL common channels. However, utilizing wide sector beams on higher frequencies (e.g., >6 GHz) may cause reduced cell coverage with the same antenna gain. Thus, in order to provide the required cell coverage on higher frequency bands, a higher antenna gain may be needed to compensate for the increased path loss.

Beamforming is a signal processing technique used in antenna arrays for supporting directional signal transmission/reception. With beamforming, a beam can be formed by combining elements in a phased array of antennas in such a way that signals at particular angles may experience constructive interference while others experience destructive interference. Different beams may be utilized simultaneously using multiple arrays of antennas. To increase the antenna gain over a wide sector beam, larger antenna arrays (e.g., the number of antenna elements of the antenna array ranging from tens to hundreds) may be used to provide high gain beams.

Nonetheless, the high gain beams may be narrow compared to a wide sector beam, and therefore, multiple beams for transmitting DL common channels may be needed to cover the required cell area. The number of concurrent high gain beams formed by an access point may be limited by the cost and complexity of the transceiver architecture of the access point. For example, on high frequencies, the number of concurrent high gain beams may be much less than the total number of beams required to cover the cell area. In other words, the access point can only cover a part of the cell area (e.g., by using a subset of beams) at any given time.

As a consequence, the gNB may utilize multiple beams to cover the whole cell area, and each UE may be associated with one of those beams. When the UE moves and/or the environment varies, the best beam for the UE may change. An L1/L2 beam management procedure may be used to switch the current beam to a new beam. Such an L1/L2 beam management procedure may refer to L1/L2 inter-beam mobility. A beam may be used on a DL control channel. The design of the beam may consider both the coverage distance and the robustness for UE mobility. Considering a control channel requiring a low data rate and high reliability, the corresponding beam may be wide enough to allow reasonable UE mobility and potential blockage. Choosing narrow beams may generate unnecessary frequent beam switching and potentially frequent connection loss on the control channel.

On the other hand, the misalignment on a beam may result in a loss of an ongoing link of a control channel (which may refer to a beam failure event). A gNB may not be able to use the same beam management procedure to switch to a new beam. Thus, the BFR mechanism may be utilized. A UE may recognize a beam failure event by measuring certain DL RS(s), the control channel(s), and/or data channel(s). One example of the beam failure recognition is that the UE detects a very low RSRP of the current serving beam based on the measurement of DL RS(s) used for beam management. If a beam failure event is recognized (or detected), the UE may notify the gNB of the beam failure event through UL transmission(s). The gNB may then perform operations with the UE to recovery the failed beam.

For example, the UE may perform a BFR procedure to inform the serving gNB of a new SSB and/or CSI-RS when the beam failure event is detected on the serving SSB(s)/CSI-RS(s). For BFD purposes, the gNB may configure the UE with one or more BFD RSs (SSB(s) or CSI-RS(s)). The UE may identify that a beam failure event has occurred if the number of beam failure instance indications from the PHY layer reaches a configured threshold before a configured timer expires. SSB-based BFD may be a procedure that is performed based on the SSB(s) associated with an initial DL BWP. In one implementation, the SSB-based BFD may only be configured for the initial DL BWP and/or for the DL BWP(s) containing the SSB(s) associated with the initial DL BWP. For other DL BWPs, BFD may only be performed based on a CSI-RS.

In one implementation, when a beam failure event is detected (e.g., on an SpCell), the UE may perform a BFR procedure that includes at least one of triggering the BFR procedure by initiating an RA procedure on the SpCell—and selecting a suitable beam to perform the BFR procedure (if the gNB has provided dedicated RA resources for certain beams, those beams will be prioritized by the UE).

In one implementation, when a beam failure event is detected on a serving cell (e.g., SpCell), the UE may trigger a BFR procedure and/or initiate an RA procedure for the serving cell (e.g., SpCell).

Upon completion of the RA procedure, the BFR procedure is considered completed.

A UE may be configured with a DRX operation that controls the UE's PDCCH monitoring activity. When performing DRX operations, the UE may monitor a PDCCH according to certain requirements (e.g., specified in the 3GPP TS 38.321 V15.6.0). For example, when operated in an RRC CONNECTED state, if the DRX operation is configured, then for all the activated serving cells, the UE may monitor the PDCCH discontinuously by using the DRX operations (e.g., specified in the 3GPP TS 38.321 V15.6.0, DRX section); otherwise, the UE may monitor the PDCCH according to the operations specified in, for example, the 3GPP TS 38.213 V15.6.0.

In one implementation, when a UE is configured with the DRX operation, the UE may not have to continuously monitor a PDCCH. The DRX operation may be characterized by the following factors:

On-duration: a time duration that the UE waits for, after waking up, to receive PDCCHs. If the UE successfully decodes a PDCCH, the UE stays awake and starts an inactivity timer;

DRX inactivity timer: used for determining a time duration that the UE waits to successfully decode a PDCCH, from the last successful decoding of a PDCCGH and upon failing to successfully decode the PDCCH, the UE can go back to sleep. The UE may restart the inactivity timer following a single successful decoding of a PDCCH for a first transmission only (e.g., not for retransmissions);

retransmission timer: used for determining a time duration until a retransmission can be expected;

DRX cycle: used for determining a periodic repetition of the on-duration followed by a possible period of inactivity;

DRX active time: the total duration that the UE monitors a PDCCH. This may include the on-duration of a DRX cycle, the time the UE is performing continuous reception while the inactivity timer has not expired, and the time when the UE is performing a continuous reception while waiting for a retransmission opportunity.

FIG. 1 is a diagram illustrating a DRX cycle, in accordance with an implementation of the present disclosure. As illustrated in FIG. 1, each DRX cycle 102 may include an on-duration 104 during which the UE may perform PDCCH monitoring. For the rest period of time (e.g., time interval 106) in the DRX cycle, it may be considered as an opportunity for DRX.

In one implementation, when a DRX cycle is configured, the (DRX) active time may include the time during which a timer is running, where the timer may be a drx-onDurationTimer, a drx-InactivityTimer, a drx-RetransmissionTimerDL, a drx-RetransmissionTimerUL, or an ra-ContentionResolutionTimer); or an SR is sent on a PUCCH and is pending; or a PDCCH indicating a new transmission (addressed to the C-RNTI of the MAC entity) has not been received, after a successful reception of an RAR for an RA preamble that is not selected by the UE's MAC entity among the contention-based RA preambles.

In one implementation, the (UE's) MAC entity may need not to monitor the PDCCH if the PDCCH is not a complete PDCCH occasion (e.g., the active time starts or ends in the middle of a PDCCH occasion).

In Release 15 (Rel-15), the BFR mechanism may only be applied for the SpCell (e.g., a PCell and/or a PSCell). If the beam blockage and/or beam failure event happens on an SCell, the UE may rely on the NW to handle it. For example, the NW may determine that a beam failure event is detected on an SCell based on the absence of ACK/NACK feedback for the scheduled DL transmission in the SCell, or depending on the CQI report for the SCell. If a beam failure event occurs, the NW may release this SCell and re-schedule the data transmission. However, this method may decrease the scheduling efficiency and increase the signaling propagation latency of the higher layer(s) (e.g., the RRC layer). In some implementations, in order to quickly recover the beam (e.g., change the serving beam) from the beam failure on the SCell, the signaling configuration and/or BFR procedure may be provided to support the BFR on the SCell.

Figure 2:
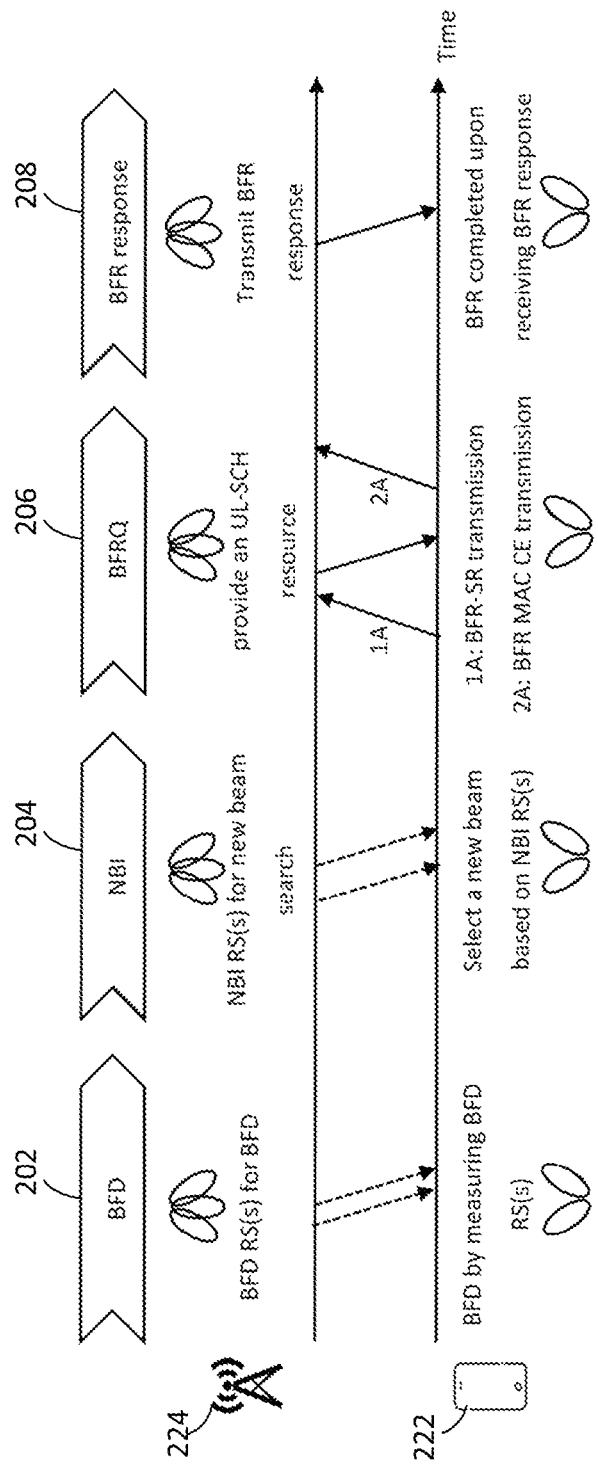
FIG. 2 illustrates a Beam Failure Detection (BFD) procedure followed by a BFR procedure for an SCell, in accordance with an implementation of the present disclosure.

FIG. 2 illustrates a BFD procedure followed by a BFR procedure for an SCell according to an implementation of the present disclosure. The BFD procedure may include action 202. The BFR procedure may include at least one of actions 204, 206, and 208. It should be understood that one or more of actions 204, 206, and 208 may be omitted from the BFR procedure.

In action 202, a BFD procedure may be performed. During the BFD procedure, a BFD RS (e.g., an SSB and/or a CSI-RS) may be explicitly or implicitly configured by the NW 224 for the UE 222 to detect a beam failure event. When a BFD RS is configured in an implicit manner, the BFD RS may be transmitted in the active BWP of the current CC or another CC.

The PHY layer of the UE 222 may assess the radio link quality according to the BFD RS. The PHY layer of the UE 222 may provide a beam failure instance indication to the higher layer (e.g., the MAC entity of the UE 222) when the radio link quality is lower than a threshold with a periodicity.

The MAC entity of the UE 222 may receive the beam failure instance indication from the lower layer (e.g., the PHY layer). A beam failure event may be detected if the number of (consecutive) detected beam failure instance indications exceeds a configured maximum number (e.g., a parameter denoted as beamfailureInstanceMaxCount). One beamfailureInstanceMaxCount may be configured for each BWP/cell/sub set of cell group/cell group. On the other hand, a counter (e.g., a parameter denoted as BFI_COUNTER) may be used for counting the number of beam failure instance indications. One BFI_COUNTER may be used for each BWP/cell/subset of cell group/cell group. A BFD timer (e.g., a parameter denoted as beamFailureDetectionTimer) may reset the BFI counter upon expiration. One beamFailureDetectionTimer may be configured for each BWP/cell/sub set of cell group/cell group.

In one implementation, when a beam failure event is detected on a serving cell (e.g., SCell), the UE 222 may trigger a BFR procedure for the serving cell (e.g., SCell). The BFR procedure may include actions 204, 206, and/or 208 illustrated in FIG. 2. In one implementation, once the BFR procedure is triggered, the UE may trigger a BFR-SR procedure (which may be considered as an SR procedure triggered for BFR) in some situations.

In action 204, an NBI operation is performed. In the NBI operation, the UE 222 may select a new beam (or a candidate beam) for a serving cell(s) based on measuring NBI RS(s). For example, the UE 222 may select a beam of which the L1-RSRP measurement result is higher than a threshold as the candidate beam.

In one implementation, a DL RS for NBI (or "NBI RS") may be transmitted on the active BWP of the CC that is configured to be monitored for BFR or another CC within the same band. The UE 222 may expect the NW 224 (e.g., gNB) to configure at least one new beam RS if the BFR configuration for corresponding SCell is configured. If the UE 222 is not configured with a new beam RS, all SSBs may be considered as the new beam RS candidates.

In one implementation, for a BFR procedure that is triggered for an SCell, the maximum number of RSs for the new beam identifications per BWP may be 64.

In action 206, a BFRQ operation may be performed during the BFR procedure. The BFRQ operation may include sub-action 1A and sub-action 2A.

In sub-action 1A, the UE 222 may send a BFR-SR over a PCell, a PSCell, and/or an SCell, where the BFR-SR may be used to inform the NW 224 of a beam failure event of a CC (s) and/or to request for an UL-SCH resource for transmitting more information about the beam failure event. In one implementation, whether sub-action 1A should be performed may be determined based on whether there is any available UL-SCH resource. For example, sub-action 1A may be skipped or omitted if the UE is configured with an UL-SCH resource that is available and/or the UL-SCH resource can be used for BFR MAC CE transmission. When the UE determines not to perform (or to skip) sub-action 1A of the BFRQ operation, the UE may (directly) perform sub-action 2A of the BFRQ operation.

In sub-action 2A, the UE may send a BFR MAC CE to the NW 224. The BFR MAC CE may include the failed CC(s) information (e.g., one or more cell indices), new-beam information (e.g., the new beam may be selected by the UE 222 by measuring the NBI RS(s)), and/or no-new-beam information. In one implementation, the BFR MAC CE may include at least one of a cell identity, a beam-presence indicator, and a candidate beam indicator. In one implementation, the no-new-beam information may be used to indicate that the UE 222 does not find any (qualified) new beam/candidate beam (e.g., the UE 222 does not find any new beam/candidate beam with the corresponding L1-RSRP higher than a threshold). In one implementation, the BFR MAC CE may be transmitted (only) via the UL grant that is requested by the BFR-SR. In one implementation, the BFR MAC CE may be transmitted via various types of UL grants (e.g., the UL grant in an RAR, the dynamic UL grant in a PDCCH, and/or a configured grant).

In action 208, a BFRR operation is performed. In the BFRR operation, the UE 222 may attempt to monitor a BFRR (e.g., via PDCCH monitoring) from the NW 224 after transmitting the BFRQ (e.g., BFR MAC CE).

In one implementation, the BFRR may be transmitted on a PCell, a PSCell, and/or an SCell. The BFRR may be transmitted on a CC on which the UE transmits the BFRQ. In one implementation, the BFRR may be transmitted on a CC that is not the same as the CC on which the UE transmits the BFRQ, e.g., via cross-carrier scheduling.

In one implementation, the BFRR may be transmitted via a normal UL grant that is scrambled by a C-RNTI/MCS-C-RNTI. The BFRR may schedule a new transmission for the same HARQ process as the PUSCH carrying the BFR MAC CE (e.g., the BFR MAC CE transmitted in sub-action 2A). Upon receiving the BFRR, the UE may consider that the BFR procedure is completed.

In one implementation, BFD RSs may refer to a set of RSs (e.g., SSB(s) and/or CSI-RS(s)), which may be used in BFD. Different sets of the BFD RSs may be associated with different CCs, cells, sets/groups of cells, and/or TRPs. For example, a first set of the BFD RSs may be associated with a first CC. If the UE detects that the quality of the first set of the BFD RSs is all lower than a threshold for a period of time, the UE may identify that the first CC is failed (or a beam failure event has occurred). A BFD RS may be transmitted in (the active BWP of) either the current CC or another CC (e.g., within the same band).

In one implementation, NBI RSs may refer to a set of RSs (e.g., SSB(s) and/or CSI-RS(s)), which may be used in NBI. Different sets of the NBI RSs may be configured for different CC, cells, sets/groups of cells, and/or TRPs. For example, a first set of the NBI RSs may be configured for a first CC (or cell). If the first CC (or cell) happens beam failure, the UE may select a new beam based on measuring the first set of the NBI RSs. The UE may select a new beam with the highest RSRP (or with an RSRP larger than a threshold) among the first set of the NBI RS. The UE may include the information of the NBI RS(s) in the BFR MAC CE. The NBI RS may be transmitted in (the active BWP of) the CC that is configured to be monitored for BFR or another CC within the same band.

In one implementation, an SR may be used for requesting an UL-SCH resource (e.g., a PUSCH resource) for a new transmission. a UE may be configured with zero, one, or more than one SR configuration. An SR configuration may include a set of PUCCH resources for SR transmission(s) across different BWPs and cells. For a logical channel, at most one PUCCH resource for SR transmission(s) may be configured based on a BWP basis. Each SR configuration may correspond to one or more logical channels. Each logical channel may be mapped to zero or one SR configuration. The SR configuration of the logical channel that triggers the BSR procedure (if the configuration of the BSR configuration exists) may be considered as a corresponding SR configuration for a triggered SR (procedure). When an SR (procedure) is triggered, the triggered SR procedure may be considered as pending until it is canceled.

As illustrated in FIG. 2, the transmission of a BFR-SR may refer to sub-action 1A in the BFRQ operation. The BFR-SR may be transmitted via a dedicated SR-like PUCCH resource for BFR. The BFR-SR may be used to inform the NW (e.g., the NW 224) of a beam failure event and/or used for requesting for an UL-SCH resource for BFR MAC CE transmission(s). A UE may be configured with zero, one, or more than one BFR-SR configuration. The PUCCH resource for BFR-SR may be configured based on a BWP/TRP/CC/set of CCs/configured grant/UE basis. The PUCCH resource for BFR-SR may be configured on a PCell, a PSCell, and/or (PUCCH) SCell. The BFR-SR may be transmitted on a PCell, a PSCell, and/or an SCell. In one implementation, the BFR-SR may be transmitted via a cross-cell transmission. For example, the beam failure event happens on an SCell, but the BFR-SR is transmitted on a PCell. The BFR-SR configuration may be a configuration that is not one of the SR configurations (e.g., the ID of the BFR-SR configuration may not be shared with a parameter denoted as schedulingRequestid, where the parameter schedulingRequestid may be specified in the 3GPP TS 38.331 V15.6.0) In one implementation, the BFR-SR configuration may be one of the SR configurations (e.g., the ID of the BFR-SR configuration is shared with the parameter schedulingRequestid). In one implementation, an RRC parameter may be used to indicate which SR configuration corresponds to the BFR-SR. The ID of the BFR-SR configuration may be configured based on a BWP basis, e.g., as a part of a BFR configuration. The BFR-SR may have the highest priority among all the SR configurations. The BFR-SR configuration may be configured based on a BWP/TRP/CC/set of CCs/configured grant/UE basis.

A BFR MAC CE may be transmitted in sub-action 2A of the BFRQ operation. In one implementation, a BFR MAC CE may be transmitted on any available UL grant that is able to accommodate the BFR MAC CE. In one implementation, the BFR MAC CE may (only) be transmitted on the UL grant that is requested by a BFR-SR. In one implementation, whether an UL grant is requested by a BFR-SR may be indicated based on implicit or explicit methods. In one implementation, the BFR MAC CE may be transmitted on a PUSCH. In one implementation, the BFR MAC CE may be transmitted on any UL grant (e.g., the UL grant provided by an RAR, type1/type 2 configured grant, dynamic grant, etc.) The BFR MAC CE may include one or more of the following items:

(failed) CC (or serving cell) information (e.g., cell index);

a (failed) set/group(s) of cells (e.g., the set/group may be pre-configured by NW);

(failed) TRP information;

the corresponding measurement result (e.g., RSRP, SINR, etc.) of the (failed) CC, set/group of cells, and/or TRP;

candidate beam information/indicator (or new-beam information), e.g., one or more qualified beams determined based on measuring NBI RS(s); and beam-presence indicator, e.g., no-new-beam information (e.g., provided if the UE cannot find any new beam with its RSRP higher than a threshold for the (failed) CC, set/group of cells, and/or TRP.)

In one implementation, the BFR MAC CE may include the following fields:

SP field: This field indicates BFD for the SpCell of the MAC entity. The SP field may be set to 1 to indicate that beam failure is detected for SpCell only when the BFR MAC CE is to be included in a MAC PDU as part of the RA procedure; otherwise, the SP field may be set to 0.

Ci field: This field indicates BFD and the presence of an octet containing the AC field for the SCell with ServCellIndex i as specified in TS 38.331. The Ci field set to 1 indicates that beam failure is detected, and the octet containing the AC field is present for the SCell with the i-th serving cell index (ServCellIndex i). The Ci field set to 0 indicates that the beam failure is not detected, and the octet containing the AC field is not present for the SCell with ServCellIndex i. The octets containing the AC field are present in ascending order based on the ServCellIndex;

AC field: This field indicates the presence of the Candidate RS ID field in this octet. If at least one of the SSBs with SS-RSRP above a threshold (e.g., rsrp-ThresholdBFR) amongst the SSBs in a candidate beam list (e.g., candidateBeamRSSCellList) or the CSI-RSs with CSI-RSRP above a threshold (e.g., rsrp-ThresholdBFR) amongst the CSI-RSs in a candidate beam list (e.g., candidateBeamRSSCellList) is available, the AC field is set to 1; otherwise, the AC field is set to 0. If the AC field is set to 1, the Candidate RS ID field is present. If the AC field is set to 0, R bits are present instead.

Candidate RS ID field: This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field may be 6 bits.

Figure 3:
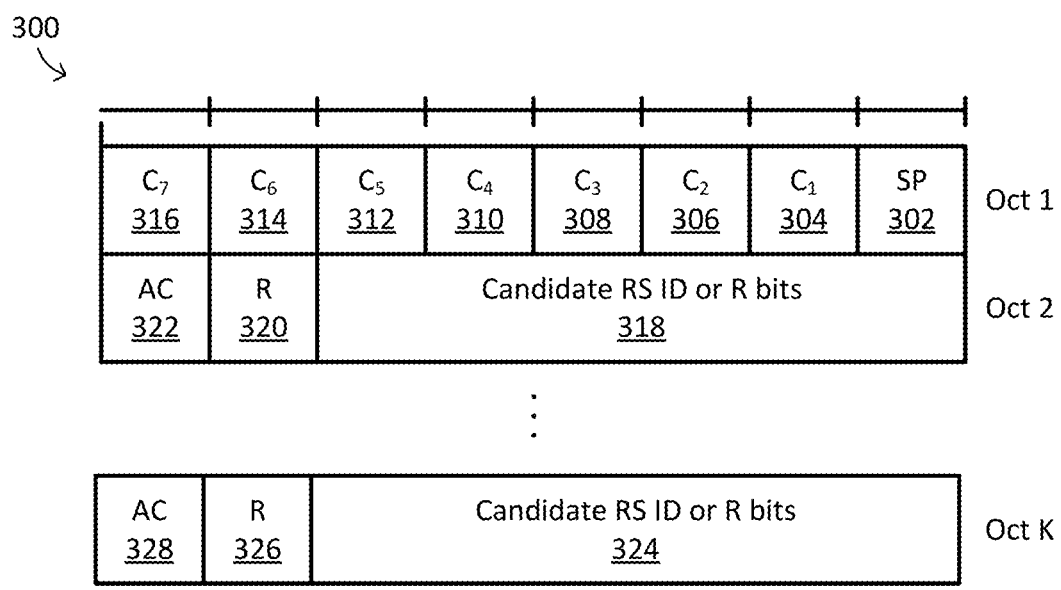
FIG. 3 illustrates an example format of a BFR MAC CE, in accordance with an implementation of the present disclosure.

FIG. 3 illustrates an example format of a BFR MAC CE 300, in accordance with an implementation of the present disclosure. As lustrated in FIG. 3, the first octet (Oct 1) of the BFR MAC CE 300 may include an SP field 302 and several $C_i$ fields (e.g., the $C_1$ field 304, the $C_2$ field 306, the $C_3$ field 308, the $C_4$ field 310, the $C_5$ field 312, the $C_6$ field 314, and the $C_7$ field 316). The second octet (Oct 2) of the BFR MAC CE 300 may include a Candidate RS ID field 318, an R bit 320, and an AC field 322. As described above, if the AC field 322 is set to 0, the Candidate RS ID field 318 may be replaced by R bits. Similarly, the K-th octet (Oct K, where K is a positive integer) of the BFR MAC CE 300 may include a Candidate RS ID field 324, an R bit 326, and an AC field 328. If the AC field 328 is set to 0, the Candidate RS ID field 324 in the same octet may be replaced by R bits.

In one implementation, multiple serving cells may fail simultaneously, and in this case, a BFR MAC CE may carry/include the information of multiple failed serving cells in one reporting instance. In one implementation, there may be only one failed serving cell, and in this case, the information of the only one failed serving cell may be included in the BFR MAC CE.

In one implementation, if a UE is configured with a BFR configuration for a serving cell (e.g., the BFR configuration indicates BFD RS(s), NBI RS(s), BFR-SR(s), PUCCH resource(s) for BFR-SR transmission, parameters for BFR (e.g., parameters denoted as BeamFailureRecoveryConfig, SCellBeamFailureRecoveryConfig, RadioLinkMonitoring-Config, etc.), the UE may determine whether a beam failure event occurs on the serving cell(s) by measuring the configured BFD RS(s). If the UE detects the beam failure event on the serving cell(s), the UE may trigger a BFR procedure, an RA procedure, trigger a BFR-SR procedure, and/or transmit a BFR MAC CE (during the BFR procedure). For example, the UE may generate and transmit the BFR MAC CE via an UL resource (e.g., a configured grant, a dynamic grant, an UL grant in an RAR, etc.) After the UE transmits the BFR MAC CE, the UE may need to monitor a PDCCH to receive a BFRR from the NW (e.g., received on a PDCCH that is addressed to a Cell Radio Network Temporary Identifier (C-RNTI)). Once the UE receives the BFRR, the UE may be aware of the NW having successfully received the BFR MAC CE. The UE may then consider that the BFR procedure, the RA procedure, and/or the BFR-SR procedure for the serving cell is successfully completed.

If the UE is configured with the DRX operation (for a cell group) (e.g., via an RRC configuration DRX-Config), the UE may discontinuously monitor a PDCCH (for the cell group). For example, the UE may only monitor the PDCCH while the UE is in the DRX active time and/or during the time that the events specified in the 3GPP TS 38.321 V15.6.0 that may indicate to the UE to monitor the PDCCH happen. In this sense, the UE may miss the BFRR in some situations, e.g., when the UE is not in the DRX active time. For example, the UE may use a configured grant to transmit the BFR MAC CE, and the UE may not start or restart the DRX inactivity timer (drx-InactivityTimer) when transmitting the BFR MAC CE via the configured grant. In this case, the UE may not monitor the PDCCH. In the present disclosure, method(s) are provided to increase the opportunities for the UE to monitor the PDCCH, thereby increasing the chances for receiving the BFRR and the efficiency of the BFR procedure.

Event-Based Approach for DRX Active Time Determination

Figure 4:
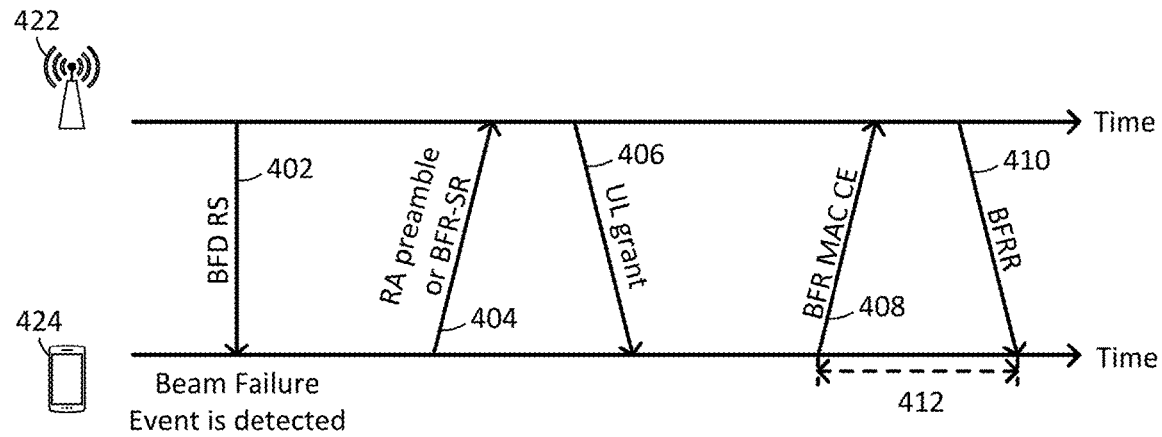
FIG. 4 is a schematic diagram illustrating a process of PDCCH monitoring for receiving a BFRR, in accordance with an implementation of the present disclosure.

In one implementation, the DRX active time may include a time interval between the transmission of a BFR MAC CE and the reception of a BFRR, as illustrated in FIG. 4.

FIG. 4 is a schematic diagram illustrating a process of PDCCH monitoring for receiving a BFRR, in accordance with an implementation of the present disclosure.

In action 402, the UE 424 may receive/measure BFD RS(s) from the NW 422 (e.g., a BS). The UE 424 may determine whether a beam failure event is detected (e.g., on a serving cell) by measuring the BFD RS(s).

In action 404, if the beam failure event is detected (e.g., on a serving cell), the UE 424 may transmit an RA preamble or a BFR-SR to the NW 422.

For example, the UE 424 may initiate an RA procedure (e.g., if the beam failure event is detected on an SpCell) and transmit an RA preamble to the NW 422.

For example, the UE 424 may transmit a BFR-SR to the NW 422 (e.g., if the beam failure event is detected on an SCell and if the UE does not have available UL resource(s) for BFR MAC CE transmission).

In action 406, the UE 424 may receive an UL grant (e.g., via PDCCH and/or RAR) from the NW 422.

In action 408, the UE 424 may transmit a BFR MAC CE to the NW 422. For example, after the UE 424 detects a beam failure event (e.g., on a serving cell), the UE 424 may trigger and/or generate a BFR MAC CE (e.g., including the cell index of the serving cell and/or the candidate beam information for the serving cell) and transmit the BFR MAC CE via a HARQ process (e.g., HARQ process 0) on a PUSCH resource to the NW 422.

In one implementation, after the UE 424 transmits the BFR MAC CE, the UE 424 may stay in the DRX active time (and/or keep monitoring PDCCH(s)) to receive a BFRR from the NW 422.

In one implementation, after transmitting the BFR MAC CE, the UE 424 may stay in the DRX active time until the UE receives the BFRR. The BFRR may be received on a PDCCH that is addressed to a C-RNTI. The BFRR may be provided in a new transmission scheduled by the NW 422 for the HARQ process. As illustrated in FIG. 4, the UE 424 may stay in the DRX active at least in the period of time 412.

In one implementation, if the UE 424 detects a beam failure event on a serving cell, the UE may initiate an RA procedure for BFR and/or trigger a BFR procedure for the serving cell. The UE 424 may trigger and/or generate a BFR MAC CE (e.g., including the cell index of the serving cell and/or the candidate beam information for the serving cell) and transmit the BFR MAC CE on a PUSCH resource to the NW 422 via a HARQ process. After the UE 424 transmits the BFR MAC CE, the UE may stay in the DRX active time (and/or continue to monitor PDCCH(s)) until the UE 424 considers that the BFR procedure is successfully completed (or the BFR procedure is considered failed or the UE cancels the BFR procedure).

In action 410, the NW 422 may transmit the BFRR to the UE 424.

As illustrated in FIG. 4, the DRX active time may start at the first (upcoming) PDCCH occasion (as specified in the 3GPP TS 38.213) after the end of the BFR MAC CE transmission. The UE may start monitoring the PDCCH(s) in the first (upcoming) PDCCH occasion (e.g., in the period of time 412) after the end of the BFR MAC CE transmission.

In one implementation, an offset may be used to reduce unnecessary PDCCH monitoring occasion(s). For example, a UE may only need to start PDCCH monitoring for BFRR reception after an offset followed by the BFR MAC CE transmission. The UE may skip the PDCCH monitoring within the offset. The offset may be configured by the NW. For example, the offset may be configured by an RRC configuration (e.g., a serving cell BFR configuration (BeamFailureRecoveryConfig, SCellBeamFailureRecoveryConfig) and/or a DRX configuration (DRX-config)). The offset may be a fixed value. The unit of the offset may be slots, symbols, subframes, or milliseconds).

Figure 5:
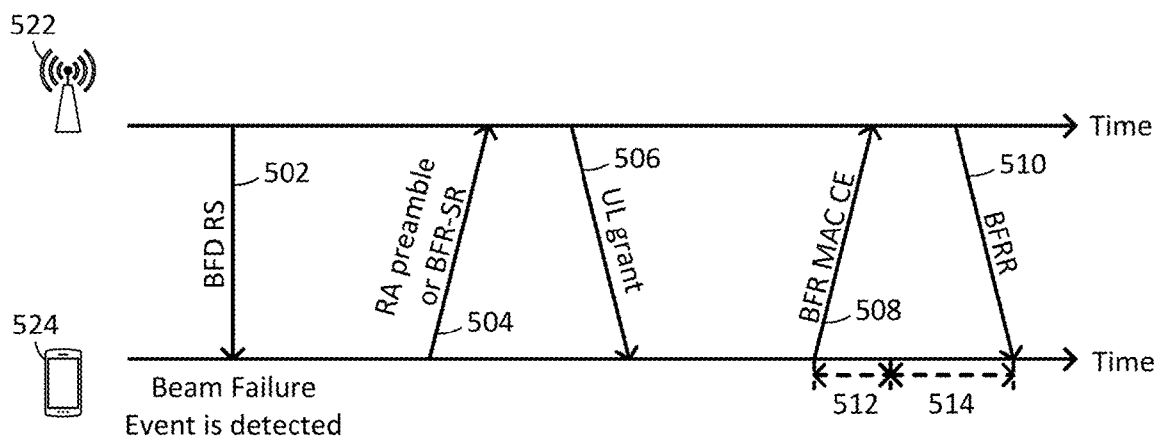
FIG. 5 is a schematic diagram illustrating a process of PDCCH monitoring for receiving a BFRR, in accordance with an implementation of the present disclosure.

FIG. 5 is a schematic diagram illustrating a process of PDCCH monitoring for receiving a BFRR, in accordance with an implementation of the present disclosure.

In action 502, the UE 524 may receive/measure BFD RS(s) from the NW 522 (e.g., a BS). The UE 524 may determine whether a beam failure event is detected (e.g., on a serving cell) by measuring the BFD RS(s).

In action 504, if the beam failure event is detected (e.g., on a serving cell), the UE 524 may transmit an RA preamble or a BFR-SR to the NW 522.

For example, the UE 524 may trigger an RA procedure (e.g., if the beam failure event is detected on an SpCell) and transmit an RA preamble to the NW 522.

For example, the UE 524 may transmit a BFR-SR to the NW 522 (e.g., if the beam failure event is detected on an SCell and if the UE does not have available UL resource(s) for BFR MAC CE transmission).

In action 506, the UE 524 may receive an UL grant (e.g., via PDCCH and/or RAR) from the NW 522.

In action 508, the UE 524 may transmit a BFR MAC CE to the NW 522. For example, after the UE 524 detects a beam failure event on a serving cell, the UE 524 may trigger and/or generate a BFR MAC CE and transmit the BFR MAC CE via a HARQ process (e.g., HARQ process 0) on a PUSCH resource to the NW 522.

In one implementation, after the UE 524 transmits the BFR MAC CE, the UE 524 may wait for an offset 512 before entering the DRX active time (and/or keeping monitoring PDCCH(s)) if the UE 524 has not received a BFRR (and/or until the UE 524 receives a BFRR). As illustrated in FIG. 5, the UE 524 may stay in the DRX active time during the period of time 514. The BFRR may be received on a PDCCH that is addressed to a C-RNTI. The BFRR may be a new transmission scheduled by the NW 522 for the HARQ process.

In one implementation, if the UE 524 detects a beam failure event on a serving cell, the UE 524 may trigger a BFR procedure for the serving cell. The UE may trigger and/or generate a BFR MAC CE and transmit the BFR MAC CE via a HARQ process on a PUSCH resource to the NW 522. After transmitting the BFR MAC CE, the UE 524 may wait for an offset 512 before entering the DRX active time (and/or keeping monitoring PDCCH(s)) until the UE 524 considers that the BFR procedure is successfully completed (or the BFR procedure is considered failed or the UE cancels the BFR procedure).

In action 510, the NW 522 may transmit the BFRR to the UE 524.

The DRX active time may start at the first (upcoming) PDCCH occasion (as specified in the 3GPP TS 38.213) after the end of the BFR MAC CE transmission. The UE may start monitoring the PDCCH(s) in the first (upcoming) PDCCH occasion after the end of the BFR MAC CE transmission.

As illustrated FIG. 5, the DRX active time may start at the first (upcoming) PDCCH occasion (as specified in the 3GPP TS 38.213) after the end of the offset 512. The UE may start monitoring PDCCH in the first (upcoming) PDCCH occasion (e.g., in the period of time 514) after the offset 512.

In one implementation, the DRX active time may include the time during which a BFR procedure for a serving cell is ongoing. For example, if a UE detects a beam failure event on a serving cell, the UE may initiate a BFR procedure for the serving cell. The UE may stay in the DRX active time (and/or continue to monitor PDCCH) while the BFR procedure for the serving cell is ongoing.

Timer-based Approach for DRX Active Time Determination

In one implementation, the DRX active time may include the time during which a timer (e.g., bfr-ResponseTimer) is running. An example is shown in FIG. 6.

Figure 6:
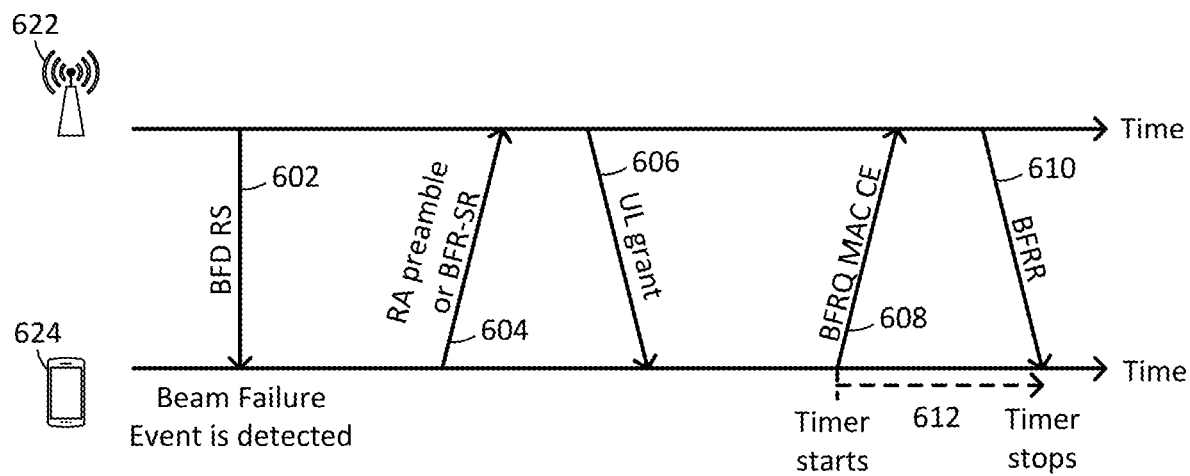
FIG. 6 is a schematic diagram illustrating a process of PDCCH monitoring for receiving a BFRR, in accordance with an implementation of the present disclosure.

FIG. 6 is a schematic diagram illustrating a process of PDCCH monitoring for receiving a BFRR, in accordance with an implementation of the present disclosure.

In action 602, the UE 624 may receive/measure BFD RS(s) from the NW 622 (e.g., a BS). The UE 624 may determine whether a beam failure event is detected (e.g., on a serving cell) by measuring the BFD RS(s).

In action 604, if the beam failure event is detected (e.g., on a serving cell), the UE 624 may transmit an RA preamble or a BFR-SR to the NW 622.

For example, the UE 624 may trigger an RA procedure (e.g., if the beam failure event is detected on an SpCell) and transmit an RA preamble to the NW 622.

For example, the UE 624 may transmit a BFR-SR to the NW 622 (e.g., if the beam failure event is detected on an SCell and if the UE does not have available UL resource(s) for BFR MAC CE transmission).

In action 606, the UE 624 may receive an UL grant (e.g., via PDCCH and/or RAR) from the NW 622.

In action 608, the UE 624 may transmit a BFR MAC CE to the NW 622.

In one implementation, after the UE 624 detects a beam failure event on a serving cell, the UE 624 may initiate an RA procedure for BFR, trigger a BFR procedure, and/or trigger and/or generate a BFR MAC CE and transmit the BFR MAC CE via a HARQ process (e.g., HARQ process 0) on a PUSCH resource (e.g., the PUSCH resource provided by the UL grant in action 606) to the NW 622. When the UE 624 transmits the BFR MAC CE, the UE may start or restart a timer (e.g., bfr-ResponseTimer). While the timer is running (e.g., during the period of time 612), the UE may stay in the DRX active time (and/or keep monitoring PDCCH(s)). Once the UE receives a BFRR (which may be provided in a new transmission scheduled by the NW 622 for the HARQ process), the UE 624 may stop the timer. In one implementation, the BFRR may be received on a Physical Downlink Control Channel (PDCCH) that is addressed to a Cell Radio Network Temporary Identifier (C-RNTI). The UE may not need to stay in the DRX active time (and/or may not need to monitor PDCCH(s)) while the timer is not running.

In one implementation, after the UE 624 detects a beam failure event on a serving cell, the UE 624 may initiate an RA procedure for BFR and/or trigger a BFR procedure for the serving cell. The UE 624 may trigger and/or generate a BFR MAC CE and transmit the BFR MAC CE via a HARQ process on a PUSCH resource to the NW 622. When the UE 624 transmits the BFR MAC CE, the UE 624 may start or restart a timer (e.g., bfr-ResponseTimer). While the timer is running (e.g., in the period of time 612), the UE 624 may stay in the DRX active time (and/or keeping monitoring PDCCH(s)). If the UE 624 considers that the BFR procedure for the serving cell is successfully completed, the UE 624 may stop the timer. The UE may not need to stay in the DRX active time (and/or may not need to monitor the PDCCH(s)) while the timer is not running.

In one implementation, the timer (e.g., bfr-ResponseTimer) may be started or restarted by the UE at one or more of the following times:

when a BFR MAC CE is transmitted (e.g., on a PUSCH resource);

at each HARQ retransmission in the first symbol after the end of a BFR MAC CE transmission (e.g., in the first (upcoming) symbol after the end of a BFR MAC CE retransmission);

after/at the end of an offset, the offset being right after an end of a BFR MAC CE transmission (e.g., on a PUSCH resource);

after/at the end of an offset, the offset being at each HARQ retransmission in the first symbol after the end of a BFR MAC CE transmission (e.g., the offset is from the end of a BFR MAC CE retransmission to the first (upcoming) symbol after the end of the BFR MAC CE retransmission);

when a BFR procedure is initiated;

when a BFR-SR procedure is triggered;

when a BFR-SR is transmitted (on a PUCCH resource).

In one implementation, the timer may be stopped by the UE at one or more of the following times:

when a BFRR is received;

when a BFR procedure is successfully completed; and when a BFR procedure is considered failed.

In one implementation, the timer (e.g., bfr-Response Timer) may be started or restarted at the first (upcoming) PDCCH occasion after the end of the BFR MAC CE transmission. The first (upcoming) PDCCH occasion may be (or may be not) after an offset following the BFR MAC CE transmission.

Window-Based Approach for DRX Active Time Determination

In one implementation, a UE may monitor a PDCCH transmission that is identified by the C-RNTI or MCS-C-RNTI within a predetermined window (e.g., bfr-Response Window).

In one implementation, if a UE detects a beam failure event on a serving cell, the UE may initiate an RA procedure for BFR, trigger a BFR procedure, and/or generate a BFR MAC CE (e.g., including the cell index of the serving cell), and/or transmit the BFR MAC CE via a HARQ process on a PUSCH resource to the NW. When the UE transmits the BFR MAC CE, the UE may start or restart a window (e.g., bfr-ResponseWindow). The window may refer to a period of time. Within the window (e.g., bfr-ResponseWindow), the UE may monitor a BFRR (e.g., PDCCH transmission that may be identified by a C-RNTI or an MCS-C-RNTI.) Once the UE successfully receives the BFRR from the NW, the UE may stop/end the window. The BFRR may be provided in a new transmission scheduled by the NW for the HARQ process.

In one implementation, if a UE detects a beam failure (event) on a serving cell, the UE may trigger a BFR procedure for the serving cell. The UE may trigger and/or generate a BFR MAC CE and transmit the BFR MAC CE via a HARQ process on a PUSCH resource to the NW. When the UE transmits the BFR MAC CE, the UE may start or restart a timer (e.g., bfr-Response Timer). While the timer is running, the UE may stay in the DRX active time (and/or keep monitoring PDCCH(s)). If the UE considers that the BFR procedure for the serving cell is successfully completed, the UE may stop/end the window. The UE may not need to stay in the DRX active time (and/or may not need to monitor PDCCH(s)) when the UE is not within the window.

In one implementation, the window (e.g., bfr-Response Window) may be started or restarted at one or more of the following times:

when a BFR MAC CE is transmitted (on a PUSCH resource);

at each HARQ retransmission in the first symbol after the end of a BFR MAC CE transmission (e.g., in the first (upcoming) symbol after the end of a BFR MAC CE retransmission);

after/at the end of an offset following a BFR MAC CE transmission (e.g., on a PUSCH resource);

after/at the end of an offset at each HARQ retransmission in the first symbol after the end of a BFR MAC CE transmission (e.g., the offset is from the end of a BFR MAC CE retransmission to the first upcoming symbol after the end of the BFR MAC CE retransmission);

when a BFR procedure is initiated/triggered;

when a BFR-SR procedure is initiated/triggered; and when a BFR-SR is transmitted (e.g., on a PUCCH resource).

In one implementation, the window (e.g., bfr-Response-Window) may be stopped at one or more of the following times:

when a BFRR is received;

when a BFR procedure is successfully completed; and when a BFR procedure is considered failed.

In one implementation, the window (e.g., bfr-Response-Window) may be started or restarted at the first (upcoming) PDCCH occasion after the end of the BFR MAC CE transmission. The first (upcoming) PDCCH occasion may be (or may be not) after an offset following the BFR MAC CE transmission. The window (e.g., bfr-ResponseWindow) may be started or restarted at the first PDCCH occasion (as specified in TS 38.213) (after the offset) from the end of the BFR MAC CE transmission.

In one implementation, a UE may be configured with a measurement gap (e.g., via a measurement gap configuration, which may be denoted as measGapConfig and specified in the 3GPP TS 38.331 V15.6.0) on a serving cell. The UE may need to perform measurements during the measurement gap on the serving cell, and therefore, the UE may not perform certain DL transmission(s) (e.g., PDCCH monitoring, DL-SCH reception, etc.) and/or UL transmission(s) (e.g., HARQ feedback transmission, SR transmission, CSI transmission, SRS report transmission, UL-SCH transmission, etc.). In this situation, the UE may (or may not) perform BFR-SR transmission(s) during the measurement gap based on the respective priority of the BFR-SR and the measurement gap.

Whether a measurement is non-gap-assisted or gap-assisted may depend on the capability of the UE, the active BWP of the UE, and the current operating frequency.

For an SSB based inter-frequency, a measurement gap configuration may be provided in at least one of the following cases:

the UE only supports per-UE measurement gaps; and the UE supports per-FR measurement gaps, and any of the configured BWP frequencies of any of the serving cells are in the same frequency range of the measurement object.

For an SSB based intra-frequency measurement, a measurement gap configuration may be provided in the following case:

Other than the initial BWP, if any of the UE-configured BWPs does not contain the frequency domain resources of the SSB associated with the initial DL BWP.

In non-gap-assisted scenarios, the UE may be able to carry out measurements without measurement gaps. In gap-assisted scenarios, the UE cannot be assumed to be able to carry out measurements without measurement gaps.

In one implementation, the UE may (or may not) need to monitor a PDCCH for a BFRR during a measurement gap.

In one implementation, the UE may (or may not) need to monitor a PDCCH while a timer (e.g., bfr-ResponseTiner) is running during a measurement gap.

In one implementation, the UE may (or may not) need to monitor a PDCCH when the UE is within a window (e.g., bfr-ResponseWindow) during a measurement gap.

The technology disclosed herein thus encompasses, but is not limited to, the following example embodiments and modes:

Example 1: A method of a UE comprising:

receiving a first configuration from a network node, wherein the first configuration is used to configure the UE with DRX related parameters;

receiving a second configuration from the network node, wherein the second configuration is used to configure the UE with beam failure recovery related parameters;

measuring a BFD reference signal, from the network node, for an SCell;

determining a beam failure is detected on the SCell based on the BFD reference signal;

Generating a MAC CE, wherein the MAC CE is used for beam failure recovery for the SCell;

transmitting the MAC CE via a HARQ process to the network node; and receiving a PDCCH indication from the network node, wherein the PDCCH indication is a new transmission scheduled by the network node for the HARQ process.

Example 2: Based on Examples 1, the UE further comprising:

staying in DRX active time after transmitting the MAC CE until receiving the PDCCH indication from the network node.

Example 3: Based on any of Examples 1 and 2, the UE further comprising:

monitoring a PDCCH while the UE is staying in DRX active time.

Example 4: Based on any of Examples 1 to 3, the UE further comprising:

Starting a timer when transmitting the MAC CE;

Monitoring a PDCCH while the timer is running; and

Stopping the timer when receiving the PDCCH indication.

Example 5: Based on any of Examples 1 to 4, wherein the UE monitors the PDCCH is to monitor PDCCH of all the activated cells in a cell group.

Example 6: Based on any of Examples 1 to 5, wherein the first configuration is DRX-config.

Example 7: Based on any of Examples 1 to 6, wherein the UE monitors the PDCCH discontinuously based on the DRX related parameters configured in the first configuration.

Example 8: Based on any of Examples 1 to 7, wherein the second configuration is used to configure the UE with an SCell beam failure recovery procedure.

Example 9: Based on any of Examples 1 to 8, wherein the second configuration includes information of the BFD reference signal.

Example 10: Based on any of Examples 1 to 9, wherein the MAC CE is a beam failure recovery request MAC CE.

Example 11: Based on any of Examples 1 to 10, wherein the MAC CE includes a cell index of the SCell.

Example 12: Based on any of Examples 1 to 11, wherein the MAC CE includes an index of a reference signal.

Example 13: Based on any of Examples 1 to 12, wherein the PDCCH indication is a beam failure recovery response.

Example 14: Based on any of Examples 1 to 13, wherein the network node is a TRP, a cell, or a gNB.

Example 15: Based on any of Examples 1 to 14, wherein the cell is a PCell, PSCell, SpCell, or SCell.

Example 16: A UE comprising:

a control circuit;

a processor installed in the control circuit;

a memory installed in the control circuit and coupled to the processor;

wherein the processor is configured to execute a program code stored in the memory to perform the method steps as defined in any one of the preceding Examples 1 to 15.

The following disclosure may be used to further elaborate the term, example, implementation, action, behavior, alternative, aspect, or example:

UE: A PHY/MAC/RLC/PDCP/SDAP entity may be included in a UE.

NW: The NW may include an NW node, a TRP, a cell (e.g., SpCell, PCell, PSCell, and/or SCell), an eNB, a gNB, and/or a BS.

serving cell: A PCell, a PSCell, or an SCell. The serving cell may be an activated or a deactivated serving cell.

SpCell: For a dual connectivity operation, an SpCell may refer to the PCell of the MCG or the PSCell of the SCG, depending on if the MAC entity is associated with the MCG or the SCG, respectively. Otherwise, the SpCell may refer to the PCell. An SpCell may support PUCCH transmission(s) and contention-based RA, and be always activated.

CC: A CC may be corresponding to PCell, PSCell, and/or SCell.

UL resource: An UL resource may be a RACH resource, a PUCCH resource, or a PUSCH resource. The UL resource may be scheduled by a dynamic grant (e.g., via a PDCCH addressed to C-RNTI), an RAR (e.g., via a PDCCH addressed to RA-RNTI), and/or configured by RRC signaling (e.g., type 1/type 2 configured UL grant or pre-configured in RRC configuration).

BFR procedure: A BFR procedure may be a BFR procedure for SpCell, and/or a SCell BFR procedure for SCell.

BFR procedure: A BFR procedure (for SpCell) may be performed based on a contention-free RA procedure and/or a contention-based RA procedure. For example, the BFR procedure (for SpCell) may be initiated when the corresponding RA procedure is initiated. The BFR procedure (for SpCell) may be considered ongoing when the corresponding RA procedure is ongoing. The BFR procedure (for SpCell) may be stopped when the corresponding RA procedure is stopped. The BFR procedure (for SpCell) may be completed when the corresponding RA procedure is completed.

SCell BFR procedure: The SCell BFR procedure may be performed based on a BFR-SR procedure. For example, the SCell BFR procedure may be initiated when the corresponding BFR-SR procedure is triggered. The SCell BFR procedure may be considered ongoing when the corresponding BFR-SR procedure is pending. The SCell BFR procedure may be stopped when the corresponding BFR-SR is canceled.

Beam: A beam may refer to a spatial domain filter. For example, when a UE reports a preferred gNB Tx beam, UE may essentially select a spatial domain filter used by the gNB. The beam information may include the information of the beam/spatial domain filter to be used/selected. In one implementation, individual RSs may be transmitted by applying individual beams (or spatial domain filters). Thus, a beam (or the beam information) may be represented by the RS resource index(es). A beam may be a DL beam and/or an UL beam. The beam may be a Tx beam and/or an Rx beam. A beam may be a UE beam and/or an NW beam. A beam may refer to an RS (e.g., an SSB, a CSI-RS, and/or an SRS), and/or a TCI state. The (new) beam may be indicated via an RS (e.g., an SSB, a CSI-RS, and/or an SRS), and/or a TCI state.

Serving beam: A serving beam for a UE may be a beam generated by the NW. The serving beam may be used to communicate with the UE, e.g., for transmission and/or reception purposes.

Sub-action 1A of the BFRQ operation illustrated in FIG. 2 may be replaced by a PRACH transmission. For example, in this sub-action, the UE may perform a PRACH transmission (e.g., transmitting a preamble) to request for an UL resource for BFR MAC CE transmission.

Sub-action 1A of the BFRQ operation illustrated in FIG. 2 may be replaced by a UCI transmission. For example, the BFR-related information may be included in a UCI. The BFR-related information may include at least one of (1) (failed) CC/cell information (e.g., cell index(s)), the (failed) set/group(s) of cells, where the set/group of cells may be pre-configured by the NW), (2) the (failed) TRP information, (3) the corresponding measurement result (e.g., RSRP, SINR, etc.) of the (failed) CC, or the set/group of cells/TRPs, (4) the candidate beam information (or new-beam information) (e.g., determining one or more qualified beams by measuring NBI RS(s)), and (5) the no-new-beam information (e.g., if there is no new beam with the corresponding RSRP higher than a threshold for the (failed) CC, set/group of cells, TRP, etc.).

An NW may have multiple TRPs (centralized or distributed). Each TRP may form multiple beams for transmission or reception. The number of beams and the number of simultaneous beams in the time/frequency domain may depend on the number of antenna array elements and the RF at the TRP. The TRP may apply beamforming to both data and control signaling transmission or reception. The number of beams generated concurrently by a TRP may depend on the TRP's capability. For example, the maximum number of beams concurrently generated by different TRPs in the same cell may be the same, and those in different cells may be different. Beam sweeping may be used, e.g., for providing control signaling in different directions.

A UE may perform beamforming for transmission or reception. A UE may concurrently generate multiple UE beams and served by multiple serving beams from one or multiple TRPs of the same cell. Same or different (DL or UL) data may be transmitted on the same radio resource via different beams for diversity or throughput gain.

Handling of Measurement Gaps

During a measurement gap, the MAC entity shall, on the serving cell(s) in the corresponding frequency range of the measurement gap configured by measGapConfig as specified in TS 38.331:

1> not perform the transmission of HARQ feedback, SR, and CSI;
1> not report SRS;
1> not transmit on UL-SCH except for Msg3;
1> if the ra-Response Window or the ra-ContentionResolutionTimer is running:
2> monitor the PDCCH.
1> else:
2> not monitor the PDCCH;
2> not receive on DL-SCH.

Figure 7:
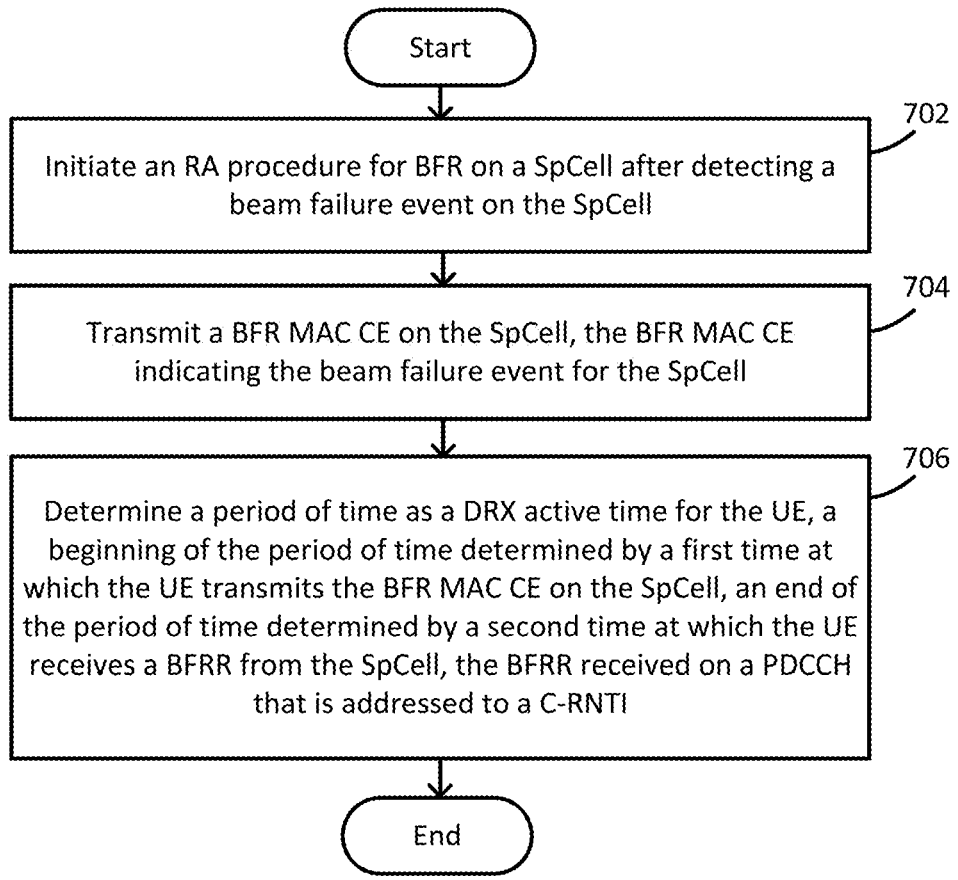
FIG. 7 illustrates a communication method performed by a UE configured with a DRX operation, in accordance with an implementation of the present disclosure.

FIG. 7 illustrates a communication method performed by a UE configured with a DRX operation, in accordance with an implementation of the present disclosure. As described previously, the DRX operation configured to the UE may control the UE's PDCCH monitoring activity and is characterized by several factors such as on-duration, inactivity timer, retransmission timer, DRX cycle, and/or DRX active time.

It should be noted that although actions 702, 704, and 706 are delineated as separate actions represented as independent blocks in FIG. 7, these separately delineated actions should not be construed as necessarily order dependent. The order in which the actions are performed in FIG. 7 is not intended to be construed as a limitation, and any number of the disclosed blocks may be combined in any order to implement the method, or an alternate method. Moreover, one or more of the actions 702, 704, and 706 may be omitted in some of the present disclosure.

In action 702, the UE may initiate an RA procedure for BFR on an SpCell after detecting a beam failure event on the SpCell. The RA procedure may be a 2-step RA procedure and/or a 4-step RA procedure. In the 2-step RA procedure, the messages may be identified as MsgA (e.g., an RA preamble and a payload) and MsgB (e.g., an RAR). In the 4-step RA procedure, the messages may be identified as Msg1 (e.g., an RA preamble), Msg2 (e.g., an RAR), Msg3 (e.g., an RRC connection request) and Msg4 (e.g., an RRC contention setup/resolution message).

In action 704, the UE may transmit a BFR MAC CE on the SpCell, where the BFR MAC CE indicates the beam failure event for the SpCell. For example, the BFR MAC CE may include at least one of a cell ID, a beam-presence indicator, and a candidate beam indicator. The BFR MAC CE may be transmitted via an UL grant that is included in an RAR of the RA procedure.

In action 706, the UE may determine a period of time as a DRX active time for the UE. The beginning of the period of time may be determined by a first time at which the UE transmits the BFR MAC CE on the SpCell. The end of the period of time may be determined by a second time at which the UE receives a BFRR from the SpCell. The BFRR may be received on a PDCCH that is addressed to a C-RNT.

In one implementation, the UE may monitor a PDCCH (or perform PDCCH monitoring) during the DRX active time. The UE may consider the RA procedure successfully completed when the UE receives the BFRR.

In one implementation, the UE may start or restart a timer at the first time (e.g., at which the UE transmits the BFR MAC CE) and stay in the DRX active time while the timer is running. In addition, the UE may stop the timer when the UE receives the BFRR. An example of the corresponding process is disclosed with reference to FIG. 8.

In one implementation, in a case that the UE does not receive the BFRR while the timer is running, the end of the period of time is determined by a third time at which the timer expires. An example of the corresponding process is disclosed with reference to FIG. 9.

In one implementation, the UE may start or restart the timer in a first upcoming symbol after an end of a retransmission of the BFR MAC CE. An example of the corresponding process is disclosed with reference to FIG. 10.

In one implementation, the UE may monitor the PDCCH while the timer is running during a measurement gap.

Figure 8:
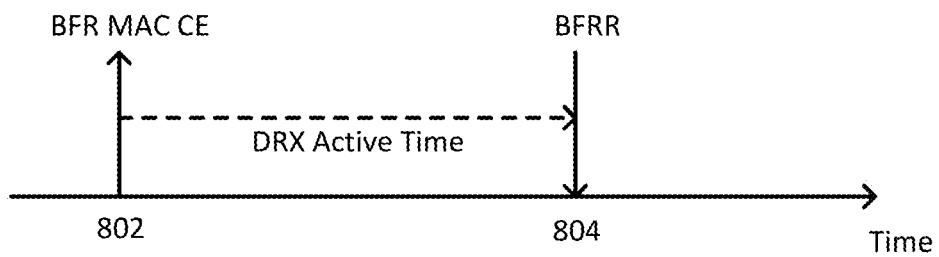
FIG. 8 illustrates a process of determining the DRX active time, in accordance with an implementation of the present disclosure.

FIG. 8 illustrates a process of determining the DRX active time, in accordance with an implementation of the present disclosure. As illustrated in FIG. 8, the UE may transmit a BFR MAC CE to the NW at time 802 and receive a BFRR at time 804. The BFR MAC CE transmission may correspond to sub-action 2A in FIG. 2.

Once the BFR MAC CE is transmitted, the UE may stay in the DRX active time until the UE receives a BFRR from the NW, where the period of time (or time interval) between time 802 and time 804 is determined as a DRX active time for the UE. For example, the UE may start or restart a timer when the UE transmits the BFR MAC CE (at time 802), and stay in the DRX active time while the timer is running. Before the timer expires, the UE may stop the timer when receiving a BFRR from the NW (e.g., at time 804).

By ensuring that the UE stays in the DRX active time for a period of time after transmitting the BFR MAC CE, the probability of failing to receive the BFRR from the NW because the UE is not in the DRX active time can be reduced.

Figure 9:
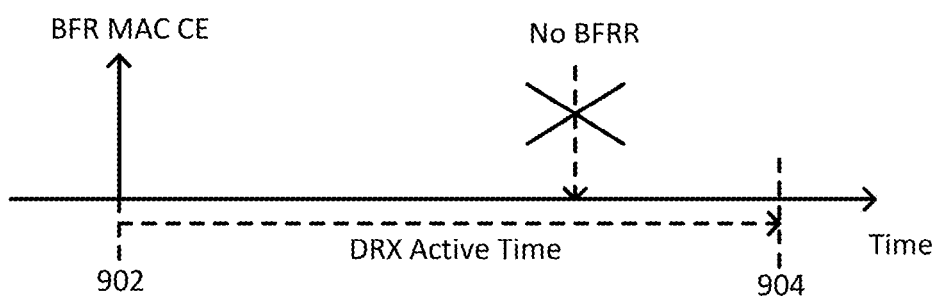
FIG. 9 illustrates a process of determining the DRX active time, in accordance with an implementation of the present disclosure.

FIG. 9 illustrates a process of determining the DRX active time, in accordance with an implementation of the present disclosure. As illustrated in FIG. 9, the UE may start or restart a timer when transmitting a BFR MAC CE at time 902, where the BFR MAC CE transmission may correspond to sub-action 2A in FIG. 2. As disclosed previously, the UE may stay in the DRX active time while the timer is running. However, if the UE does not receive any BFRR from the NW before the timer expires, the UE may end the DRX active time when the timer expires. As illustrated in FIG. 9, because the UE does not receive any BFRR from the NW before the expiry of the timer, the DRX active time ends at time 904 at which the timer expires.

Figure 10:
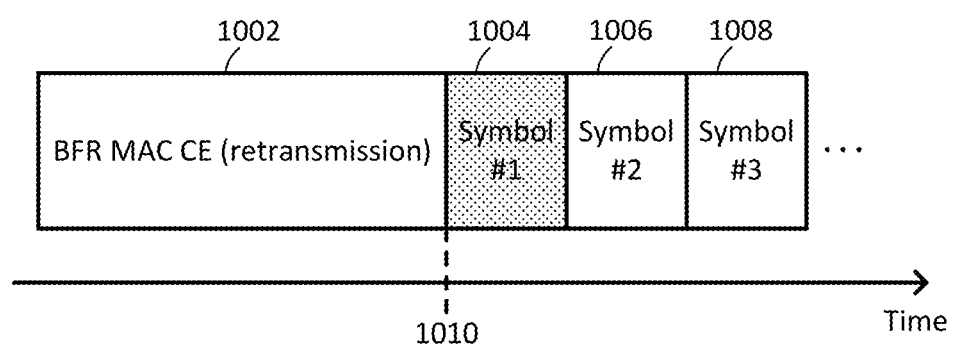
FIG. 10 illustrates a process of restarting a timer after a retransmission of a BFR MAC CE, in accordance with an implementation of the present disclosure.

FIG. 10 illustrates a process of restarting a timer after a retransmission of a BFR MAC CE, in accordance with an implementation of the present disclosure. As disclosed previously, the retransmission of a BFR MAC CE may cause a restart of a timer that determines the DRX active time (the UE stays in the DRX active time while the timer is running). As illustrated in FIG. 10, a retransmission 1002 of a BFR MAC CE ends (or is completed) at time 1010. Right after time 1010, several symbols (e.g., symbol #1 1004, symbol #2 1006, and symbol #3 1008) sequentially continue. In this situation, the UE may restart the timer (used for determining the DRX active time) in the first symbol (e.g., symbol #1 1004) immediately after time 1002 (the end of the retransmission 1002 of the BFR MAC CE).

Figure 11:
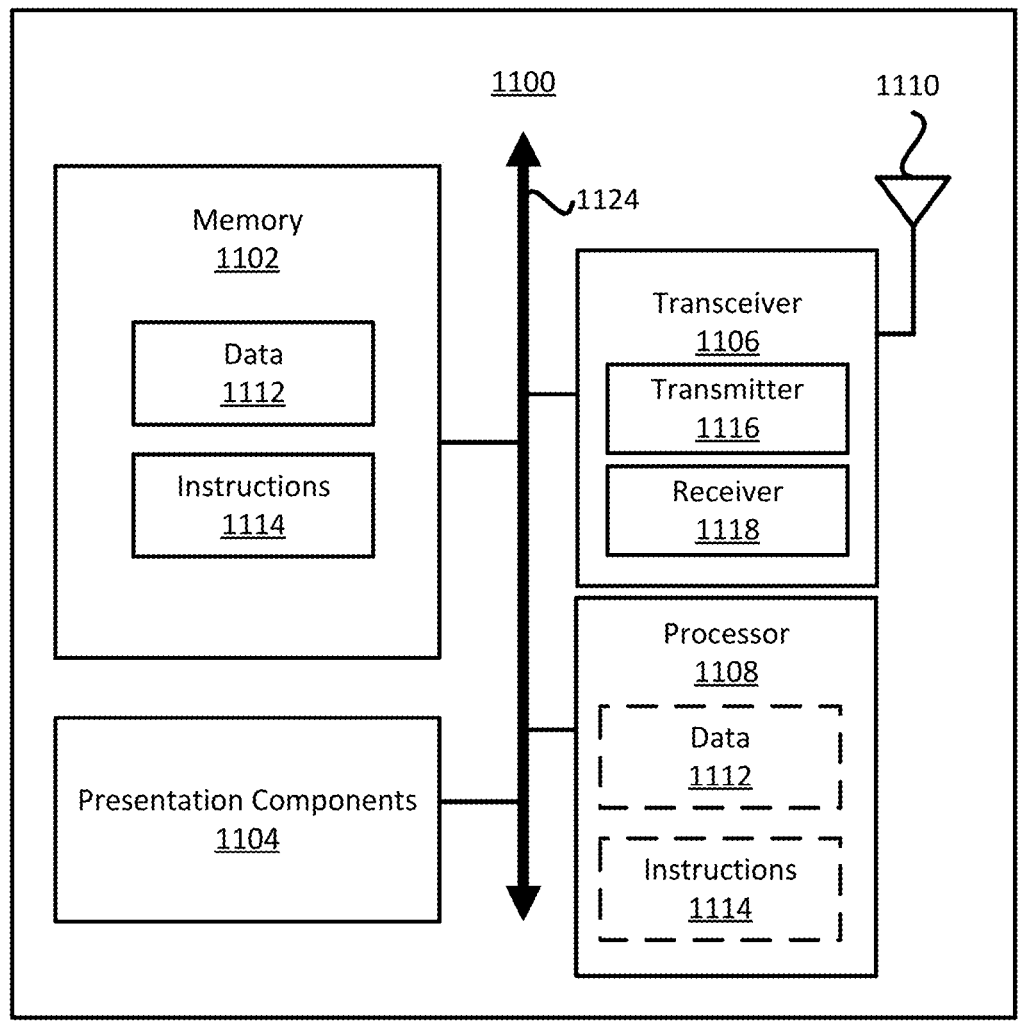
FIG. 11 illustrates a block diagram of a node for wireless communication, in accordance with various aspects of the present disclosure.

FIG. 11 illustrates a block diagram of a node for wireless communication, in accordance with various aspects of the present disclosure. As illustrated in FIG. 11, the node 1100 may include a transceiver 1106, a processor 1108, a memory 1102, one or more presentation components 1104, and at least one antenna 1110. The node 1100 may also include an RF spectrum band module, a BS communications module, a network communications module, and a system communications management module, Input/Output (I/O) ports, I/O components, and a power supply (not explicitly illustrated in FIG. 11). Each of these components may be in communication with each other, directly or indirectly, over one or more buses 1124. In one implementation, the node 1100 may be a UE or a BS that performs various functions disclosed herein, for example, with reference to FIGS. 1 through 10.

The transceiver 1106 having a transmitter 1116 (e.g., transmitting/transmission circuitry) and a receiver 1118 (e.g., receiving/reception circuitry) may be configured to transmit and/or receive time and/or frequency resource partitioning information. In one implementation, the transceiver 1106 may be configured to transmit in different types of subframes and slots, including, but not limited to, usable, non-usable, and flexibly usable subframes and slot formats. The transceiver 1106 may be configured to receive data and control channels.

The node 1100 may include a variety of computer-readable media. Computer-readable media can be any available media that can be accessed by the node 1100 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 1102 may include computer storage media in the form of volatile and/or non-volatile memory. The memory 1102 may be removable, non-removable, or a combination thereof. For example, the memory 1102 may include solid-state memory, hard drives, optical-disc drives, etc. As illustrated in FIG. 11, the memory 1102 may store computer-readable and/or computer-executable instructions 1114 (e.g., software codes) that are configured to, when executed, cause the processor 1108 to perform various functions disclosed herein, for example, with reference to FIGS. 1 through 10. Alternatively, the instructions 1114 may not be directly executable by the processor 1108 but may be configured to cause the node 1100 (e.g., when compiled and executed) to perform various functions disclosed herein.

The processor 1108 (e.g., having processing circuitry) may include an intelligent hardware device, a Central Processing Unit (CPU), a microcontroller, an ASIC, etc. The processor 1108 may include memory. The processor 1108 may process the data 1112 and the instructions 1114 received from the memory 1102, and information through the transceiver 1106, the baseband communications module, and/or the network communications module. The processor 1108 may also process information to be sent to the transceiver 1106 for transmission through the antenna 1110, to the network communications module for transmission to a CN.

One or more presentation components 1104 may present data indications to a person or other devices. Examples of presentation components 1104 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Still, many rearrangements, modifications, and substitutions are possible without departing from the scope of the present disclosure.

What is claimed is:

1. A communication method performed by a User Equipment (UE) configured with a Discontinuous Reception (DRX) operation, the communication method comprising:
   initiating a Random Access (RA) procedure for a Beam Failure Recovery (BFR) on a Special Cell (SpCell) after detecting a beam failure event on the SpCell;
   receiving, after initiating the RA procedure, a Random Access Response (RAR);
   transmitting, on the SpCell, a BFR Medium Access Control (MAC) Control Element (CE) via a Physical Uplink Shared Channel (PUSCH) determined by an uplink grant indicated by the RAR, the BFR MAC CE indicating the beam failure event for the SpCell;
   starting a timer after transmitting the BFR MAC CE via the PUSCH on the SpCell; and
   stopping the timer after receiving a BFR Response (BFRR) from the SpCell, wherein the BFRR is received on a Physical Downlink Control Channel (PDCCH) that is addressed to a Cell Radio Network Temporary Identifier (C-RNTI).

2. The communication method of claim 1, further comprising:
   monitoring the PDCCH while the timer is running.

3. The communication method of claim 1, further comprising:
   monitoring the PDCCH until the timer expires, wherein stopping the timer comprises stopping the timer when the BFFR is received while the timer is running.

4. The communication method of claim 1, further comprising:
   restarting the timer in a first symbol after an end of a retransmission of the BFR MAC CE.

5. The communication method of claim 1, further comprising:
   monitoring the PDCCH while the timer is running during a measurement gap.

6. The communication method of claim 1, wherein the BFR MAC CE includes at least one of a cell identity, a beam-presence indicator, or a candidate beam indicator.

7. The communication method of claim 1, further comprising:
   considering that the RA procedure is successfully completed when the UE receives the BFRR.

8. A User Equipment (UE) configured with a Discontinuous Reception (DRX) operation, the UE comprising:
   at least one memory storing computer-readable instructions; and
   at least one processor coupled to the at least one memory, the at least one processor configured to execute the computer-readable to cause the UE to:
   initiate a Random Access (RA) procedure for a Beam Failure Recovery (BFR) on a Special Cell (SpCell) after detecting a beam failure event on the SpCell;
   receive, after initiating the RA procedure, a Random Access Response (RAR);
   transmit, on the SpCell, a BFR Medium Access Control (MAC) Control Element (CE) via a Physical Uplink Shared Channel (PUSCH) determined by an uplink grant indicated by the RAR, the BFR MAC CE indicating the beam failure event for the SpCell;
   start a timer in after transmitting the BFR MAC CE via the PUSCH on the SpCell; and
   stop the timer after receiving a BFR Response (BFRR) from the SpCell, wherein the BFRR is received on a Physical Downlink Control Channel (PDCCH) that is addressed to a Cell Radio Network Temporary Identifier (C-RNTI).

9. The UE of claim 8, wherein the at least one processor is further configured to execute the computer-readable instructions to cause the UE to:
   monitor the PDCCH while the timer is running.

10. The UE of claim 8, wherein the at least one processor is further configured to execute the computer-readable instructions to cause the UE to:
    monitor the PDCCH until the timer expires, wherein stopping the timer comprises stopping the timer when the BFFR is received while the timer is running.

11. The UE of claim 8, wherein the at least one processor is further configured to execute the computer-readable instructions to cause the UE to:
    restart the timer in a first symbol after an end of a retransmission of the BFR MAC CE.

12. The UE of claim 8, wherein the at least one processor is further configured to execute the computer-readable instructions to cause the UE to:
    monitor the PDCCH while the timer is running during a measurement gap.

13. The UE of claim 8, wherein the BFR MAC CE includes at least one of a cell identity, a beam-presence indicator, or a candidate beam indicator.

14. The UE of claim 8, wherein the at least one processor is further configured to execute the computer-readable instructions to cause the UE to:
    consider that the RA procedure is successfully completed when the UE receives the BFRR.

* * * * *